(12) United States Patent
Jaeschke (10) Patent No.: US 8,153,932 B2
(45) Date of Patent: Apr. 10, 2012

(54) METHOD AND DEVICE FOR CONTROLLING A POWER SOURCE AND POWER SOURCE HAVING SUCH A DEVICE

(75) Inventor: Birger Jaeschke, Backnang (DE)

(73) Assignee: Lorch Schweisstechnik GmbH, Auenwald (DE)

(*) Notice: Subject to any disclaimer, the term of this patent is extended or adjusted under 35 U.S.C. 154(b) by 222 days.

(21) Appl. No.: 12/653,398

(22) Filed: Dec. 9, 2009

(65) Prior Publication Data

US 2010/0133249 A1    Jun. 3, 2010

Related U.S. Application Data (63) Continuation of application No. PCT/EP2008/001959, filed on Mar. 12, 2008.

(30) Foreign Application Priority Data

Jun. 12, 2007  (DE) .................. 10 2007 028 160

(51) Int. Cl.
*B23K 10/00* (2006.01)

(52) U.S. Cl. ......... 219/130.21; 219/121.54; 219/121.45; 219/121.46; 219/130.5

(58) Field of Classification Search ............. 219/130.21, 219/121.39, 121.47, 121.54, 121.57, 121.45, 219/130.4, 130.31, 130.41
See application file for complete search history.

(56) References Cited

U.S. PATENT DOCUMENTS

| | | | |
|---|---|---|---|
| 4,292,497 A | 9/1981 | Paton et al. | |
| 4,745,255 A | 5/1988 | Mettier | |
| 5,942,139 A | 8/1999 | Moriguchi et al. | |
| 2003/0071024 A1 | 4/2003 | Hsu | |
| 2006/0060574 A1 | 3/2006 | Blankenship et al. | |

FOREIGN PATENT DOCUMENTS

| | | |
|---|---|---|
| GB | 1 453 901 | 10/1976 |
| JP | 57 149072 | 9/1982 |

OTHER PUBLICATIONS

Analog Devices AD7400, "Isolated Sigma-Delta Modulator", 2006, 20 pages.
Analog Devices AD7764, "24-Bit, 312 kSPS, 109dB ΣΔ ADC, With On-Chip Buffers, Serial Interface", 2007, 23 pages.

*Primary Examiner* — Mark Paschall
(74) *Attorney, Agent, or Firm* — Lipsitz & McAllister, LLC (57) ABSTRACT

A method and device for controlling a power source of a welding, cutting or plasma coating system is provided. The power source comprises a measuring part and a controllable clocked power part. A value correlating with a characteristic variable of the power part to be controlled is continuously measured by means of the measuring part, to obtain an electrical measured variable. The electrical measured variable is at least approximately integrated starting from a prescribed initial value over a prescribed integration time, the duration of which corresponds to one or more clock periods of the clocked power part. A measure value is continuously determined from the integration value and used to control the power part.

30 Claims, 4 Drawing Sheets

METHOD AND DEVICE FOR CONTROLLING A POWER SOURCE AND POWER SOURCE HAVING SUCH A DEVICE

This application is a continuation of international application number PCT/EP2008/001959 filed on Mar. 12, 2008.

The present disclosure relates to the subject matter disclosed in international application number PCT/EP2008/001959 of Mar. 12, 2008 and German application number 10 2007 028 160.0 of Jun. 12, 2007, which are incorporated herein by reference in their entirety and for all purposes.

BACKGROUND OF THE INVENTION

The invention relates to a method for controlling the power source of a welding, cutting or plasma coating system, wherein the power source comprises a measuring part and a controllable clocked power part and wherein a measure value, which represents a measure of a characteristic variable, that is to be controlled, of the power part, is determined by means of the measuring part, and the measure value is used for controlling the power part.

Electric welding systems as well as electrical cutting systems and plasma coating systems have a power source with a power part, which provides a controllable output voltage or a controllable output current or makes it possible for the output current and the output voltage to undergo combined control. In the case of electric welding systems, a welding electrode may be connected to the power part by way of an electric cable to form an arc between the welding electrode and a workpiece to be welded. In a corresponding way, in the case of plasma coating systems, a controllable output voltage or a controllable output current may be provided by means of the clocked power part, so that a plasma for coating a workpiece can be produced within a coating chamber. For it to be supplied with energy, the clocked power part may be connected to a supply network. In many cases, the power part has a transformer and electrical converters. Furthermore, in many cases the power part comprises electrical components for smoothing the output current and/or the output voltage. Used for this purpose, for example, are internal impedances, in particular coils and resistors. The electric cable that can be connected to the power part as well as the welding electrode and the arc or the plasma electrode and the electrical discharge in the coating chamber form external impedances and external ohmic resistances. It is desirable for the voltage drop across the arc or the electrical discharge to be detected as quickly and exactly as possible for purposes of process control. This voltage can be calculated from the output voltage of the clocked power part with allowance made for the external impedances and ohmic resistances.

The output voltage, the output current or else the emitted power of the clocked power part represent characteristic variables of the power part, which are usually controlled by means of a control part, for example time-dependently or as a reaction to specific process states. A measure value is often determined with the aid of a measuring part as a measure of the characteristic variable to be controlled, and is then used for controlling the power part. A mean value over time of the characteristic variable to be controlled may be determined, for example, as the measure value.

The characteristic variable is usually subject to variations over time on account of changes of the external circuit connected to the power part. In the case of electric welding systems, for example, the arc voltage may strongly fluctuate process-dependently on account of changes in the length of the arc and on account of the occurrence of short-circuits between the welding electrode and the workpiece to be welded, or else on account of breaking of the arc. These fluctuations in turn influence the output voltage of the clocked power part, which is also distinguished by periodic changes on account of the clocked operation of the power part.

For effective control of a characteristic variable of the power part, it is desirable to determine the measure value within a short time, in order also to allow short-time fluctuations of the characteristic variable to be counteracted. Potential-affected converters or else potential-isolating converters are usually used for determining the measure value. It is also known to detect the characteristic variable itself by means of the measuring part and to smooth it by way of lowpass elements or active filters of a higher order and to use the measured value smoothed in this way for controlling the characteristic variable. There are also known power sources in which the measured value already smoothed by way of lowpass elements is additionally subjected to an analog-digital conversion and then processed by means of a digital signal processor. These known methods have the disadvantage that they are relatively time-consuming, so that, in particular, short-term fluctuations of the characteristic variable of the power part that is to be controlled can only be insufficiently counteracted.

It is object of the present invention to develop a method of the type mentioned at the beginning in such a way that a measure of the characteristic variable to be controlled can be determined within a short time.

SUMMARY OF THE INVENTION

This object is achieved according to the invention in the case of a method of the type mentioned at the beginning by at least approximately integrating, starting from a prescribed initial value, an electrical measured variable correlating with the characteristic variable of the power part to be controlled, over a prescribed integration time, the duration of which corresponds to one or more clock periods of the clocked power part, and determining the measure value from the integration value obtained in this way, this process being continuously repeated. An electrical voltage or an electrical current may be used, for example, as the electrical measured variable.

The invention includes the idea that rapid control of the characteristic variable can be achieved by repeatedly integrating, starting from a prescribed initial value, a measured variable correlating with the characteristic variable to be controlled over a prescribed integration time and using the integration value obtained in this way for forming the measure value which represents a measure of the characteristic variable to be controlled and is used in controlling the clocked power part. If the output voltage of the power part is to be controlled as the characteristic variable, the measured variable may be identical to the output voltage. However, it may also be provided that the measured variable is proportional to the output voltage or in some other fixed correlation with the output voltage. The integration time is a single clock period or a multiple of a single clock period of the clocked power part. If the characteristic variable to be controlled is, for example, the output voltage, this has periodic variations which correspond to the clock frequency of the clocked power part and the period duration of which corresponds to the clock period of the clock frequency. The integration of the measured variable is carried out over an integration time of a duration which corresponds to one clock period or an integral multiple of one clock period. It may therefore be provided, for example, that the measured variable is integrated over just a single clock period and the measure value is determined from the integration value obtained in this way and used in turn for controlling the power part. This integration process is continuously repeated, so that an up-to-the-instant integration value is continuously available and can be used to determine an up-to-the-instant measure value. Very rapid control of the characteristic variable can be achieved as a result, so that even brief fluctuations of the characteristic variable can be effectively counteracted.

The integration of the measured variable synchronized in time with the clock pulse of the power part has in particular the advantage that the changes over time of the characteristic variable that are brought about by the clocking of the power part can be filtered out over time to the extent that these changes over time are not classified as disturbing influences that have to be compensated by corresponding control of the power part.

The determination of the measure value from the integration value obtained may take place, for example, by multiplying the integration value by the inverse value of the integration time, so that the measure value represents the mean over time of the measured variable correlating with the characteristic variable of the power part.

Alternatively, it may be provided that the integration value itself is used as the measure value, since, with a constant integration time, this represents a measure of the characteristic variable to be controlled. With a changing integration time, it is however advantageous to multiply the integration value by the inverse value of the respective integration time, in order to obtain a measure that is correlated with the characteristic variable to be controlled and can be used for controlling the power part.

It is of particular advantage if the measured variable is at least approximately integrated in a clock-synchronous manner over one or more clock periods of the clocked power part. The integration of the measured variable consequently takes place in time with the clock pulse of the power part. The integration time here is one clock period or an integral multiple of one clock period.

In particular, it may be provided that the measured variable is at least approximately integrated in a clock-synchronous manner over a single clock period of the power part. This makes particularly rapid control of the characteristic variable possible.

It is of advantage if the integration value is determined by means of the measuring part, then the integration value determined is sampled and stored in a buffer memory and the measuring part is subsequently reset to the initial value for renewed determination of an integration value. Consequently, an integration value which is first stored in a buffer memory and then can be used for determining the measure value, which in turn is used in controlling the power part, is periodically determined. After the storing of an integration value that has been determined, the measuring part is reset again to the initial value, for example to the value 0, so that renewed integration can then be carried out over a prescribed integration time with a defined prescribed initial value, the integration value corresponding to the duration of one or more clock periods of the clocked power part.

It is of advantage if, after the elapse of the integration time, the integration value that has been determined is sampled by the measuring part and buffer-stored, and the measuring part is reset again to the initial value, within one or more clock periods of the clocked power part, and then a new integration value is again determined in a clock-synchronous manner. In the case of such an embodiment, the sampling and buffer-storing of the integration value and the resetting of the measuring part take place in accordance with the clocking of the power part. This has the advantage that, after resetting of the measuring part to the initial integration value has taken place, integration can be commenced immediately. This makes particularly rapid control of the characteristic variable possible.

It is preferable to provide a measuring part having at least two measuring elements, with the aid of which an integration value can be respectively determined on an alternating basis, wherein, during the time in which an integration value is determined by means of a first measuring element, the integration value previously determined by means of the second measuring element is sampled and buffer-stored and the second measuring element is reset to the initial value. This has the advantage that an updated integration value is continuously provided and at the same time a new integration value is determined. The respective integration values of the two measuring elements may be brought together in a downstream signal processing unit, for example a mean value of the two integration values may be determined and may then again represent a measure of the characteristic variable to be controlled.

It is particularly advantageous if, with the aid of the at least two measuring elements, the measured voltage is at least approximately integrated on an alternating basis over clock periods of the clocked power part respectively following immediately one after the other. This has the advantage that an up-to-the-instant integration value is available after each clock period.

For the synchronization of the measuring part, it is advantageous if the clock frequency of the power part is applied to a clock input of said measuring part. The clock frequency of the power part is consequently used for determining the integration, sampling and resetting times of the measuring part. This makes possible in particular a clock-synchronous integration of the measured variable, a clock-synchronous sampling of the integration value and also a clock-synchronous resetting of the measuring part to the predetermined initial value of the integration.

An at least approximate integration of the measured variable may be carried out, for example, by using a capacitor which is connected in series with an ohmic resistor, the charge voltage present at the capacitor being periodically sampled, the capacitor subsequently discharged and then a renewed integration carried out. In the case of such a configuration, the capacitor is charged by way of the ohmic resistor by an electrical voltage present at the series connection comprising the ohmic resistor and the capacitor. Here it is possible by appropriate dimensioning of the resistor and the capacitor for the charge voltage that is present at the capacitor to be chosen much lower than the amplitude value of the voltage present at the series connection, so that an approximate integration is achieved. Before the beginning of a renewed measuring process, the capacitor is discharged again to the desired initial value of the voltage through external switching means. A value close to zero is advantageous as the initial value of the voltage, since then the capacitor can be easily discharged by way of an electronic switch, for example a MOSFET.

It may also be provided that integrating analog-digital converters which are synchronized with the clock frequency of the power part are used for the at least approximate integration.

It is advantageous if an analog-digital converter which produces a continuous digital data stream from which the integration value is formed by addition or by at least approximate-integrating digital filtering over the integration time is used for the at least approximate integration. With the aid of a digital 1-bit A/D converter, a sequential data stream of logical zeros and ones can be produced from the signal to be measured. This data stream may be fed by way of controllable switching elements to at least one numerically summating accumulation element, which summates the sequential data stream over a specific integration time and consequently forms the integration value. After the elapse of the predetermined integration time, the accumulation element is reset to an initial value by means of further controllable switching elements. By way of controllable switching elements, the numerically formed integration value may be stored as the result of the integration in a buffer memory for further data processing. The integration value may, for example, be provided by the buffer memory to a control part of the power source. The structure comprising at least one numerically summating accumulation element which is fed with a sequential data stream by an analog-digital converter is often referred to as a "sigma-delta converter", and the analog-digital converter in connection with controllable switching or transmission elements is also referred to as a "sigma-delta modulator". Such structures are preferably realized in the form of programmable electronic circuits.

Alternatively, synchronizable triggerable operational amplifiers may also be used for the at least approximate integration.

An at least approximate integration of the measured variable may also be achieved by high-frequency sampling of said variable, for example at a sampling frequency which corresponds to one thousand times the clock frequency of the power part, and by numerically adding the results of the sampling.

It is of particular advantage if a microelectronic circuit is used for the at least approximate integration. This makes it possible for the power source to be of a particularly compact form of construction.

In the case of an advantageous embodiment of the method according to the invention, the sampling and buffer storing of an integration value that has been determined take place with the aid of a circuit referred to as a sample-and-hold circuit. With the aid of such circuits, an integration value can be stored for a short time in a buffer memory, so that, after integration has taken place, the measuring part can be reset again immediately to the desired initial value of the integration. The buffer-stored integration value may then, for example, be fed to an analog-digital converter which is in electrical connection with a control part of the power source.

As already mentioned, the output voltage of the power part may be used as the characteristic variable to be controlled.

The output voltage itself may be used as the measured variable to be integrated, which is correlated with the output voltage to be controlled. It may, however, also be provided that an internal voltage of the power part is used as the measured variable, the internal voltage representing an indication of the output voltage. It may, for example, be provided that the power part comprises smoothing elements, in particular inductances and ohmic resistors, and that the voltage present at the smoothing elements is used as the measured variable.

The output current of the power part may also be used as a characteristic value to be controlled. If the power source is used for a welding system, the welding current may be used, for example, as the characteristic variable. This likewise has variations over time which correspond to the clocking of the power part. The method according to the invention also makes possible here a very rapid and very exact determination of a measure value which represents a measure of the welding current to be controlled. Here, the welding current may be directed by way of a measuring resistor, across which a voltage drop that is correlated with the welding current can then be integrated in the way mentioned above. It may also be provided that the welding current is converted with the aid of a current converter to a smaller measured current, which is then integrated. For example, the measured current may be used to charge a capacitor, the charge voltage of which then forms the integration value.

In addition to the method explained above, the invention also relates to a device for carrying it out, the device having a measuring part which comprises a measuring circuit having at least one triggerable measuring element, wherein, by means of the measuring element, a measured variable can be at least approximately integrated continuously and repeatedly starting from a prescribed initial value over a prescribed integration time. By means of such a device, a measured variable correlating with a characteristic variable, that is to be controlled, of the power part of a power source, can be integrated starting from a prescribed initial value over a prescribed integration time, the duration of which corresponds to one or more clock periods of the clocked power part, and the integration value thus obtained can then be used to determine in the way mentioned above the measure value desired for controlling the characteristic variable.

In the case of a preferred embodiment, the measuring circuit has at least two triggerable measuring elements, wherein the measured variable can be at least approximately integrated on an alternating basis over prescribable integration times by means of the measuring elements. As already explained, an up-to-the-instant integration value can be continuously provided by the alternating integration of the measured variable by means of the two measuring elements.

In the case of a preferred embodiment of the device according to the invention, the measuring part has in addition to a measuring circuit at least one sample-and-hold circuit, which is disposed downstream of the measuring circuit. It is advantageous here if a number of sample-and-hold circuits are used, respectively disposed downstream of a measuring element, so that the integration value provided by a measuring element can be buffer-stored in the associated sample-and-hold circuit in order to feed it subsequently to an analog-digital converter.

For the synchronization of the measuring circuit with the clocked power part, it is of advantage if the measuring circuit has at least one clock input, to which an external clock frequency can be applied.

In the case of a configuration of the device according to the invention that is of a particularly simple construction and is not susceptible to disturbances, the at least one triggerable measuring element comprises a capacitor, which is connected in series with an ohmic resistor, as well as a sampling element, wherein the charge voltage present at the capacitor can be periodically sampled by the sampling element and wherein, after the sampling has taken place, the capacitor can be discharged to a prescribed initial value. As already explained, this makes an approximate integration of a measured variable in the form of an electrical voltage possible, since it makes a charging current available to the capacitor by way of the ohmic resistor, so that the capacitor is charged to a charge voltage which can be sampled by the sampling element. By appropriate dimensioning of the ohmic resistor and the capacitor, the charge voltage can be kept considerably lower than the amplitude value of the electrical voltage present at the series connection comprising the ohmic resistor and the capacitor, so that an approximate integration can be achieved. Before the beginning of a renewed integration, the capacitor is discharged again to the initial value of the charge voltage through external switching means. A value close to zero is advantageous here as the initial value of the voltage, since then the capacitor can be easily discharged by way of an electronic switch, for example a MOSFET.

In the case of an advantageous configuration, the at least one triggerable measuring element of the measuring circuit comprises an analog-digital converter which can be synchronized with an external clock frequency. This makes very exact integration of the measured voltage possible.

As already explained, it is of advantage if the at least one triggerable measuring element comprises an analog-digital converter which is connected by way of controllable or logical switching or transmission elements to a summating accumulation element, wherein a continuous data stream provided by the analog-digital converter can be summated over the integration time by means of the accumulation element. After the elapse of the integration time, the accumulation element may be reset to an initial value by way of logical or controllable switching or transmission elements, and the accumulation value provided by the accumulation element after the elapse of an integration time may preferably be provided for a buffer memory, the output of which can be connected to a control part.

It may also be provided that the at least one triggerable measuring element has a synchronizable operational amplifier.

The measuring circuit is preferably configured as a microelectronic circuit. It is of particular advantage if the entire measuring part is configured as a microelectronic circuit.

The device according to the invention is used in particular in the case of power sources for welding systems, cutting systems or plasma coating systems. The invention therefore also relates to a power source for a welding or cutting system or a plasma coating system, having a control part and a clocked power part as well as a device of the kind mentioned above. The device may be disposed between an output line of the power part and an earth line and be connected to a control input of the control part, so that a measure value determined by the device can be entered by way of the control input to the control part for controlling the clocked power part. A clock input of the device may be connected to a clock output of the controlling part, so that the clock frequency of a clock generator of the control part can be applied to the device.

The clocked power part may have switching elements which make a controlled change of the polarity of the output voltage and/or the output current of the power part possible. In this case, the measuring circuit may have measuring elements for the separate, at least approximate integration of positive and negative current or voltage values. It may alternatively be provided that the measured value acquisition is preceded by converters which convert the current or voltage value to be detected always to the polarity that can be detected by at least one measuring element.

It is of advantage if positive and negative measured variables can be integrated by means of the measuring circuit.

The following description of preferred embodiments of the invention serves for a more detailed explanation in conjunction with the drawings.

DETAILED DESCRIPTION OF THE INVENTION

Figure 1:
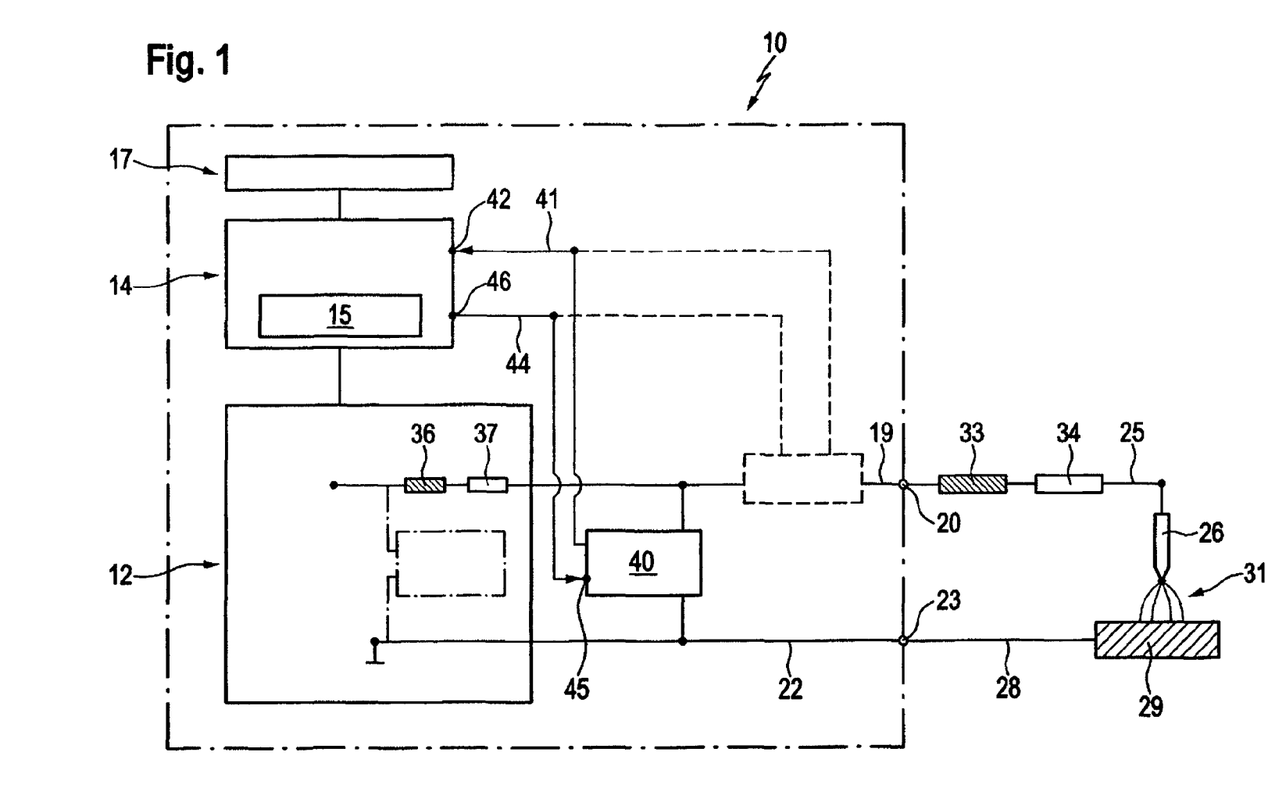
FIG. 1 shows a schematic representation of a power source according to the invention for a welding system.

In FIG. 1, a schematic representation of a welding power source 10 according to the invention is shown, having a clocked power part 12, which is adapted to be controlled by a control part 14. The control part 14 has a clock generator 15 for producing a clock frequency, which is provided for the clocked power part 12.

Connected to the control part 14 is an operating part 17. The operating part has a number of operating elements that are known per se and are therefore not represented in the drawing, by way of which the welding power source 10 can be operated by the user.

The clocked power part 12 is connected by way of an output line 19 to a voltage output 20 of the welding power source 10, and the clocked power part 12 is connected by way of an earth line 22 to an earth output 23 of the power part 12.

The welding power source 10 is used in the case of electric welding systems. Connected for this purpose to the voltage output 20 may be an electric cable 25, which carries a welding torch 26 at its free end. An earth cable 28 may be connected on the one hand to the earth output 23 of the welding power source 10 and on the other hand to a workpiece 29 to be welded. To supply energy, the welding power source 10 may be connected by way of a supply cable that is known per se and therefore not represented in the drawing to an energy supply network that is likewise not represented in the drawing, in particular a public supply network, for example a 230 V or 400 V AC voltage network.

By applying a welding voltage to the welding torch 26, an arc 31 for welding the workpiece 31 can be produced between the welding torch 26 and the workpiece 29.

In combination with the welding torch 26, the arc 31, the workpiece 29 and the earth line 28, the electric cable 25 forms an external welding circuit, the impedances and ohmic resistances of which are illustrated in FIG. 1 in a simplified form, in the manner of an equivalent circuit diagram, by the external impedance 33 and the external ohmic resistance 34.

The power part 12 likewise has impedances and ohmic resistances which represent smoothing elements for the smoothing of the output voltage provided by the power part 12. These internal smoothing elements are illustrated in FIG. 1 in a simplified form by the internal impedance 36 and the internal ohmic resistance 37.

A characteristic variable of the clocked power part 12 is represented by the output voltage present between the output line 19 and the earth line 22. The output voltage may be controlled by the control part 14 to achieve an optimum welding result. To provide a measure of the output voltage, the welding power source 10 has a measuring part 40, which is connected between the output line 19 and the earth line 22, is explained in more detail below and is only schematically represented in FIG. 1. The measuring part 40 is connected by way of a control line 41 to a control input 42 of the control part 14, and a clock input 45 of the measuring part 40 is in electrical connection with a clock output 46 of the control part 14 by way of a clock line 44. The clock frequency of the clock generator 15 can be provided for the measuring part 40 by way of the clock line 44, and a measure value that represents a measure of the output voltage, that is to be controlled, of the power part 12 can be provided for the control part 14 by way of the control line 41 for controlling the power part 12.

Figure 2:
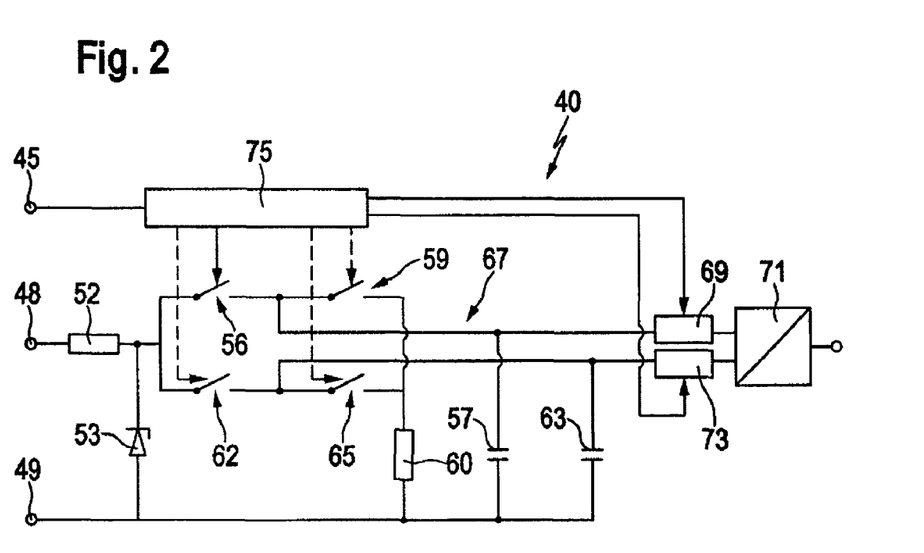
FIG. 2 shows a first embodiment of a measuring part of the power source from FIG. 1.

The measuring part 40 is represented in a simplified form in FIG. 2. In addition to the clock input 45, it comprises a signal input 48 and an earth input 49, which are connected to each other by way of an ohmic resistor 52 and a Zener diode 53. Connected in parallel with the Zener diode 53 by way of a first electronic switch 56 is a first capacitor 57, and connected in parallel with the first capacitor 57 by way of a second electronic switch 59 is a discharge resistor 60.

Also connected in parallel with the Zener diode 53, by way of a third electronic switch 62, is a second capacitor 63, which can be discharged by way of a fourth electronic switch 65, likewise by way of the discharge resistor 60. The first capacitor 57 forms a first measuring element of the measuring part 40 and the second capacitor 63 forms a second measuring element. The ohmic resistor 52, the Zener diode 53 and the two capacitors 57 and 63 together with the common discharge resistor 60 and the four switches 56, 59, 62 and 65 altogether form a measuring circuit 67 of the measuring part 40.

The voltage present at the first capacitor 57 can be picked off by a first sample-and-hold circuit 69, which is connected to an analog-digital converter 71. The voltage present at the second capacitor 63 can be picked off by way of a second sample-and-hold circuit 73, which is likewise connected to the analog-digital converter 71. The output of the analog-digital converter 71 is connected with the control input 42 of the controlling part 14 by way of the control line 41 already explained, and the two inputs 48 and 49 can be connected to the output line 19 and the earth line 22 respectively. Consequently, the output voltage of the power part 12 can be applied to the inputs 48, 49 of the measuring part 4.

If the first switch 56 is closed and at the same time the third switch 62 is open, a current which results in charging of the first capacitor 57 can flow from the signal input 48 by way of the ohmic resistor 52 and by way of the first capacitor 57. If the first switch 56 is open and the second switch 59 is closed, the first capacitor 57 can discharge by way of the discharge resistor 60.

In a corresponding way, the second capacitor 63 can be charged by opening of the first switch 56 and closing of the third switch 62 and can be discharged by way of the discharge resistor 60 by opening of the third switch 62 and closing of the fourth switch 65.

The ohmic resistor 52 and the two capacitors 57 and 63 are dimensioned such that the charge voltage present at the capacitors 57 and 63 remains much lower than the amplitude value of the measured variable present at the inputs 48 and 49, which is identical to the output voltage of the power part 12.

Figure 3A:
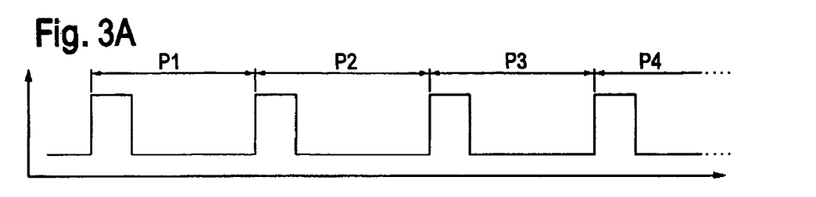
FIGS. 3A to 3G show voltage variations and switching states to explain the measuring part from FIG. 2.

By means of the measuring circuit 57, an approximate integration of the measured variable can be performed in a manner which is clock-synchronous with the output voltage of the clocked power part 12. This is explained in more detail below with reference to FIGS. 3A to 3G. FIG. 3A schematically shows the variation over time of the output voltage of the clocked power part 12. In the embodiment represented, this output voltage represents the characteristic variable, that is to be controlled, of the welding power source 10. The clock pulse of the power part 12 is reflected in the output voltage by periodic variations, which in FIG. 3A are illustrated at regular time intervals, specifically with the clock period P.

Figure 3B:
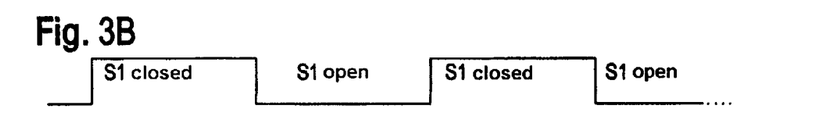

The switching of the first electronic switch 56 is schematically represented in FIG. 3B, the first switch 56 being denoted in this figure by S1. It respectively changes its switching position in successive periods. During the first clock period P1, the first electronic switch 56 is closed, during the immediately following second clock period P2 it is open, to then assume its closed switching state again in the third clock period. In the fourth clock period P4, it is then open again. This sequence is continuously repeated.

Figure 3C:
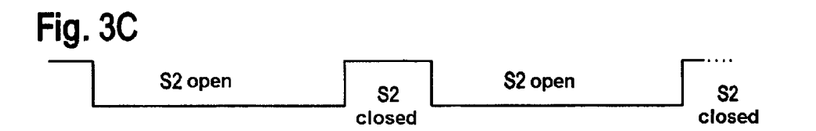

The switching position of the second electronic switch 59 is schematically represented in FIG. 3C, the second electronic switch 59 being denoted in this figure by S2. During the first clock period P1 and the first half of the second clock period P2, it assumes its open switching position, is then closed during the second half of the second clock period P2, to subsequently assume its open switching position during the third clock period P3 and the first half of the fourth clock period P4. This switching sequence is also continuously repeated.

Figure 3D:
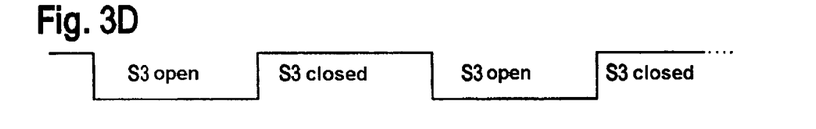

The switching position of the third electronic switch 62 is schematically represented in FIG. 3D, this switch being denoted in FIG. 3D by S3. It assumes in each case the switching position contrary to the first electronic switch 56. During the first clock period P1, the third electronic switch 62 is open, during the second clock period P2 it is closed, during the third clock period it is open again, and this change of the switching position continues periodically.

Figure 3E:
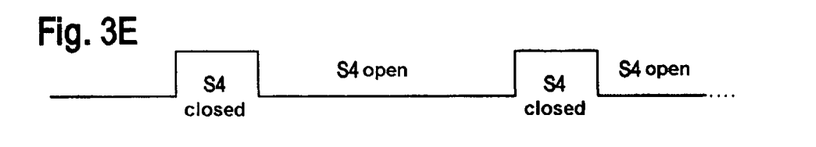

The switching position of the fourth electronic switch 65 is schematically represented in FIG. 3E, it being denoted in this figure by S4. During the second half of the first clock period, it assumes its closed switching position, and it is open during the second clock period and the first half of the third clock period. Subsequently, it is closed during the second half of the third clock period, to then assume its open switching position again.

Figure 3F:
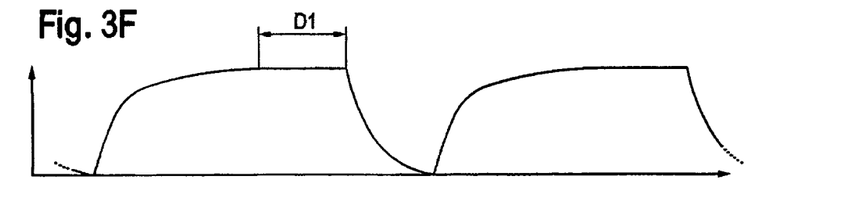

FIG. 3F schematically shows the variation over time of the charge voltage present at the first capacitor 57. Since the first switch 56 is closed during the first clock period P1, and the third switch 62 is open, the first capacitor 57 continuously charges during the first clock period P1. After the elapse of the first clock period P1, the first switch 56 is opened, so that the charge voltage present at the first capacitor 57 retains a virtually constant value during the first half of the second period P2, until the second switch 59 is closed after the elapse of the first half of the second clock period P2. The closing of the second switch 59 has the effect that the first capacitor 57 is discharged during the second half of the second clock period P2. Subsequently, the charging and discharging process is repeated, since, during the third clock period P3, the first switch 56 is closed, the third switch 62 is open and the second switch 59 also assumes its open switching position. The first capacitor 57 can therefore recharge, then retains its charge voltage during the first half of the fourth clock period P4, to subsequently be discharged again through closing of the second switch 59. The charge voltage present at the first capacitor 57 is sampled during the first half of the second clock period P2 by the first sample-and-hold circuit 59 and is buffer-stored in the customary way, to then be fed to the analog-digital converter 71. The first half of the second clock period P2 consequently forms a data takeover interval D1 for the integration value which has been determined by the approximate integration during the first clock period P1. Once the data takeover has taken place, the first capacitor 57 is discharged, so that at the beginning of the third clock period P3 it again has its initial charge voltage of approximately 0 V and a renewed integration can be performed.

Figure 3G:
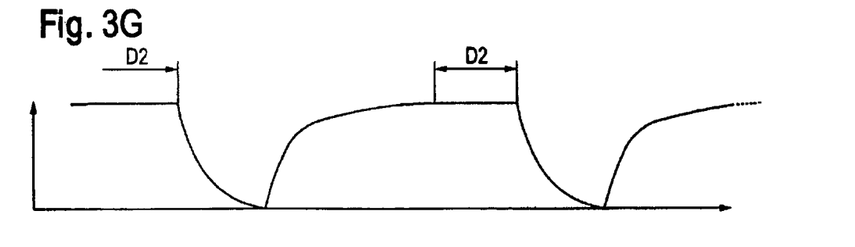

In FIG. 3G, a schematic representation of the variation over time of the charge voltage present at the second capacitor 63 is shown. The variation over time largely corresponds to that of the charge voltage of the first capacitor 57, but the charge voltage of the second capacitor 63 is offset in time by a clock period with respect to the variation over time of the charge voltage of the first capacitor 57. To be specific, the third electronic switch 62 is open during the first clock period P1, and the second capacitor 63 is discharged by closing of the fourth electronic switch 65 during the second half of the first clock period P1. Subsequently, the third switch 62 is closed during the second clock period P2, whereas the fourth electronic switch 65 assumes its open switching position. Consequently, the second capacitor 63 is charged in alternation with the first capacitor 57. While the data takeover at the first capacitor 57 and subsequently the resetting of the first capacitor 57 to the initial value of its charge voltage are taking place, the second capacitor 63 is being charged. After the elapse of the second clock period P2, the third switch 62 is opened again, so that during the first half of the third clock period P3 the charge voltage present at the second capacitor 63 can be sampled by the second sample-and-hold circuit 73. The first half of the third clock period P3 consequently forms a data transfer interval D2 for the second capacitor 63. Subsequently, the second capacitor 63 is discharged during the second half of the third clock period P3, by the fourth switch 64 being closed. During the second half of the third clock period P3, the charge voltage of the second capacitor 63 is consequently reset to the initial value of approximately 0 V. During the fourth clock period P4, the second capacitor 63 is then recharged by opening of the first switch 56 and closing of the third switch 62.

The controlling of the electronic switches 56, 59, 62 and 65 takes place by means of a clock processing unit 75, to the input side of which the clock frequency of the clock generator 15 can be applied by way of the clock input 45 and which is connected on the output side to control inputs of the switches 56, 59, 62 and 65. The clock processing unit 75 is consequently a component part of the measuring circuit 67. However, it may also be provided that the clock processing unit 75 is integrated in the control part 14, which then controls the electronic switches 56, 59, 62 and 65 in a manner that is directly synchronous with the clock frequency of the power part 12.

It is clear from the above that an approximate integration of the measuring variable present at the inputs 48, 49 can be performed on an alternating basis by the capacitors 57 and 63 connected in series with the ohmic resistor 52. The respective integration value is sampled, buffer-stored for a time and then passed on to the analog-digital converter 71, which passes a digital signal corresponding to the respective integration value to the control part 14 by way of the control line 41. From this signal, a mean value over time that represents a measure of the output voltage of the power part 12 can be determined by multiplication by the inverse value of the period duration. The mean value obtained in this way requires calibration. For this purpose, a known calibrating voltage may be applied to the measuring part 40 during a calibrating step and then integrated by the measuring part 40 in the way explained above. The respective integration value is used for the forming of the mean value over time. Subsequently, the deviation of the mean value determined by the measuring part 40 from the mean value of the applied calibrating voltage is determined and a corresponding correction value is stored in the control part 14. Consequently, a correction can be performed by the control part 14 while operation is in progress, so that an up-to-the-instant actual value of the output voltage of the clocked power part 12 is continuously available to the control part 14 through the use of the measuring part 40. This actual value can be compared in the customary way with a desired value prescribed by the user by means of the operating part 17 for controlling the output voltage of the clocked power part 12.

Figure 4:
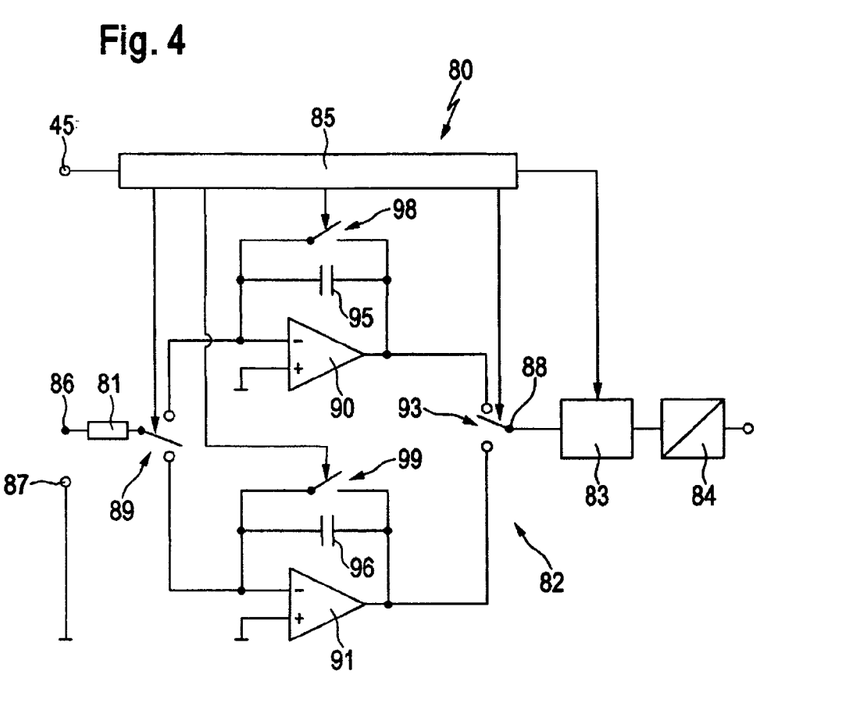
FIG. 4 shows a second embodiment of a measuring part of the power source from FIG. 1

In FIG. 4, a schematic representation of a second embodiment of a measuring part is shown which can be used as an alternative to the measuring part 40 in the case of the welding power source 10. The second embodiment of a measuring part is designated in FIG. 4 by the reference numeral 80. The measuring part 80 comprises a measuring circuit 82 as well as a sampling element in the form of a sample-and-hold circuit 83 and an analog-digital converter 84, which is connected to the output of the sample-and-hold circuit 83 and, by way of the control line 41, is connected on the output side with the control input 42 of the control part 14. Furthermore, the measuring circuit 82 comprises a clock processing unit 85.

The measuring circuit 82 has a signal input 86 and an earth input 87 as well as an output 88. By way of an ohmic resistor 81 and a first electronic changeover switch 89, the first input 86 is alternatingly in electrical connection with a first measuring element in the form of a first operational amplifier 90 or with a second measuring element in the form of a second operational amplifier 91. The outputs of the two operational amplifiers 90, 91 are connected by way of a second electronic changeover switch 93 to the output 88 of the measuring circuit 82. The two operational amplifiers 90, 91 respectively have two amplifier inputs, one amplifier input being connected in each case to the first changeover switch 89 and the second amplifier input being connected to earth. The output of the first operational amplifier 90 is connected by way of a first capacitor 95 to the first amplifier input and, in a corresponding way, the output of the second operational amplifier 91 is in electrical connection by way of a second capacitor 96 with the first amplifier input of the second operational amplifier 91. The first capacitor 95 can be bridged by a first electronic switch 98 and the second capacitor 96 can be bridged by a second electronic switch 99.

A measured variable, for example in the form of the output voltage of the clocked power part 12, can be applied to the inputs 86, 87. This measured variable can then be integrated on an alternating basis in immediately successive clock periods of the output voltage by means of the two operational amplifiers 90, 91 and the capacitors 95, 96 by corresponding opening and closing of the switches 98, 99 and changing of the switching position of the changeover switches 89 and 93. The controlling of the switches 98, 99 and of the changeover switches 89, 93 takes place by means of the clock processing unit 85, which forms a component part of the measuring circuit 82, but which could also be integrated in the control part 14. The respective integration value that is provided by the operational amplifiers 90, 91 can be sampled by the sample-and-hold circuit 83 by way of the second changeover switch 93 and buffer-stored for a time, to then be fed to the analog-digital converter 84. A digital signal which is provided by the analog-digital converter 84 and corresponds to the respective integration value can then be transmitted by way of the control line 41 to the control part 14, as explained in more detail above with reference to FIG. 2. The measuring part 40 represented in FIG. 2 only makes an approximate integration possible here, whereas a true integration of the measured voltage present at the inputs 86, 87 can be carried out with the measuring part 80.

Consequently, the measuring part 80 also makes rapid control of the output voltage of the clocked power part 12 possible, since an up-to-the-instant measure of the output voltage, that is to be controlled, of the power part 12, is provided by clock-synchronous integration and respective resetting of the integration value to an initial value. Before the measuring part 80 is used, it can similarly be calibrated in the way explained with reference to the example of the measuring part 40.

Figure 5:
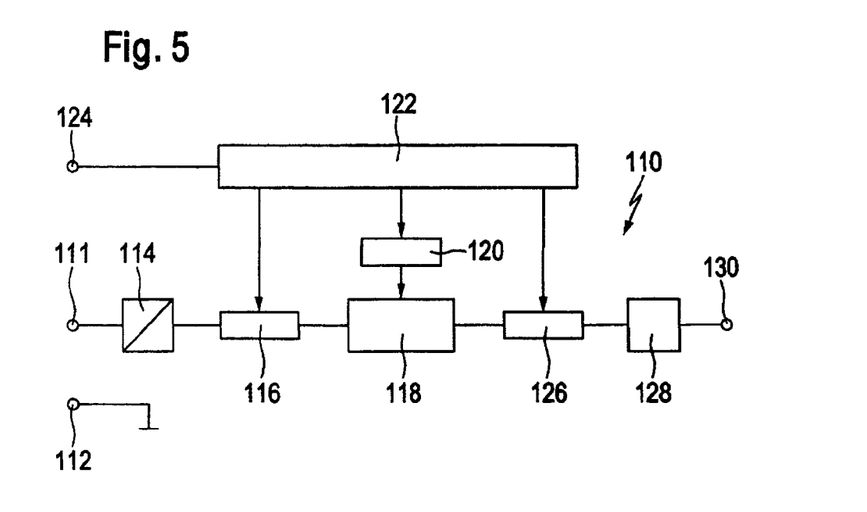
FIG. 5 shows a third embodiment of a measuring part of the power source from FIG. 1.

A third embodiment of a measuring part is schematically represented in FIG. 5 and designated as a whole by the reference numeral 110. The measuring part 110 comprises a signal input 111 and an earth input 112. The signal input 111 is followed by a 1-bit analog-digital converter 114, which is connected by way of a controllable switching element 116 to a numerically summating accumulation element 118. The latter can be controlled by way of a controllable switching element 120 by a clock processing unit 122, which is connected to a clock input 124 of the measuring part 110.

The output of the accumulation element 118 is connected by way of a further controllable switching element 126 to a buffer memory 128, the output of which is in electrical connection with the signal output 130 of the measuring part 110. The signal output 130 can be connected by way of the already explained control line 41 to the control input 42 of the control part 14.

During operation, the measuring signal to be integrated is applied to the signal input 111. The digital 1-bit analog-digital converter 114 produces a sequential data stream of logical zeros and ones from the signal to be measured. This data stream is fed by way of the controllable switching element 116 to the numerically summating accumulation element 118, which can be reset to a prescribed initial value by the controllable switching element 120 and numerically summates the sequential data stream over a predetermined integration time, and consequently forms the integration value. This integration value is fed by way of the controllable switching element 126 to the buffer store 128, from which the integration value is provided for the control part 14 by way of the control line 41. The controlling of the measuring part 110 takes place by way of the clock processing unit 122, which is connected with the clock output 46 of the control part 14 by way of the clock input 124 and the signal line 44.

In the case of the measuring part 110, an approximate integration can also be achieved in a simplified manner by the controllable switching elements 116, 120 and 126 in connection with the buffer memory 128 carrying out a digital filtering. This filtering makes an approximate integration possible.

The structure of the numerically summating accumulation element 118, to which a sequential data stream is provided by the 1-bit analog-digital converter 114, is generally referred to in the technical literature as a "sigma-delta converter", and the 1-bit analog-digital converter 114 in connection with the controllable switching element 116 is generally also referred to as a "sigma-delta modulator". These structures are preferably realized in the form of programmable electronic circuits.

Not only the output voltage of the clocked power part 12 can be used as the measured variable to be at least approximately integrated for the measuring parts 40, 80 and 110. It may alternatively be provided that an internal voltage of the clocked power part 12 is used as the measured variable for the measuring parts 40, 80 and 110, in particular the voltage which is provided by the power part 12 before the internal smoothing elements of said part, that is to say before the internal impedance 36 and the internal ohmic resistance 37. Such a possibility for a circuit is represented in FIG. 1 by dash-dotted lines.

The output current of the welding power source 10 may also be used as the characteristic variable, that is to be controlled, of the power source 10. For this purpose, a measuring resistor may be disposed in the output line 19 and the voltage drop occurring across this measuring resistor may then be used as the measured variable for the measuring part 40, 80 or 110. In the same way as the output voltage of the power part 12, this measured variable may be at least approximately integrated by means of the measuring parts 40, 80 or 110, so that a measure value which represents a measure of the characteristic variable to be controlled, in this case a measure of the output current, to be controlled, of the clocked power part 12, can likewise be provided. Such use of the measuring parts 40, 80 and 110 is represented in FIG. 1 by dashed lines.

It may also be provided that the welding current is converted by means of a current converter to a measured current with a lower amplitude and the measured current is integrated, for example in such a way that a capacitor is charged and the charge voltage of the capacitor then forms the integration value, which in turn represents a measure value for the welding current to be controlled.

The invention claimed is:

1. Method for controlling a power source, the power source comprising an electronic measuring part and a controllable clocked power part, the method comprising:
   continuously measuring a value, correlating with a characteristic variable of the power part, to be controlled, by means of the measuring part, to obtain an electrical measured variable,
   at least approximately integrating the electrical measured variable starting from a prescribed initial value over a prescribed integration time to determine an integration value, a duration of the prescribed integration time corresponding to one or more clock periods of the clocked power part,
   continuously determining a measure value from the integration value, and
   controlling the power part via a control signal comprising the measure value.

2. Method according to claim 1, wherein to determine the measure value, the integration value is multiplied by an inverse value of the integration time.

3. Method according to claim 1, wherein the measured variable is at least approximately integrated in a clock-synchronous manner over one or more clock periods of the clocked power part.

4. Method according to claim 3, wherein the measured variable is at least approximately integrated in a clock-synchronous manner over a single clock period of the power part.

5. Method according to claim 1, wherein:
   the integration value is determined by means of the measuring part,
   the integration value is sampled and stored in a buffer memory, and
   the measuring part is subsequently reset to the prescribed initial value for renewed determination of an integration value.

6. Method according to claim 5, wherein after elapse of the integration time, the integration value that has been determined is sampled by the measuring part and buffer-stored, and the measuring part is reset again to the prescribed initial value, within one or more clock periods of the clocked power part, and then a new integration value is again determined in a clock-synchronous manner.

7. Method according to claim 1, wherein:
   the measuring part comprises at least two measuring elements,
   with the aid of the at least two measuring elements, the integration value is respectively determined on an alternating basis,
   during the time in which the integration value is determined by means of a first measuring element, the integration value previously determined by means of the second measuring element is sampled and buffer-stored and the second measuring element is reset to the prescribed initial value.

8. Method according to claim 7, wherein with aid of the at least two measuring elements, the measured variable is at least approximately integrated on an alternating basis over clock periods of the clocked power part respectively following immediately one after the other.

9. Method according to claim 1, wherein a clock frequency of the power part is applied to a clock input of the measuring part.

10. Method according to claim 1, wherein:
a capacitor which is connected in series with an ohmic resistor is used for the integrating of the measured variable,
a charge voltage present at the capacitor is periodically sampled,
the capacitor is subsequently discharged and then a renewed integration of the measured variable is carried out.

11. Method according to one of claim 1, wherein integrating analog-digital converters which are synchronized with a clock frequency of the power part are used for the integrating.

12. Method according to claim 1, wherein an analog-digital converter which produces a continuous digital data stream from which the integration value is formed by addition or by at least approximate-integrating digital filtering over the integration time is used for the integrating.

13. Method according to claim 1, wherein synchronizable triggerable operational amplifiers are used for the integrating.

14. Method according to claim 1, wherein a microelectronic circuit is used for the integrating.

15. Method according to claim 1, wherein the integration value that has been determined is sampled and buffer-stored by means of a sample-and-hold circuit.

16. Method according to claim 1, wherein an output voltage of the power part is used as the characteristic variable to be controlled.

17. Method according to claim 1, wherein an internal voltage of the power part is used as the value which is measured.

18. Method according to claim 1, wherein an output current of the power part is used as the characteristic variable to be controlled.

19. Device for controlling a power source with a controllable clocked power part, comprising:
a measuring part which comprises a measuring circuit having at least one triggerable measuring element,
wherein:
the measuring part continuously measures a value correlating with a characteristic variable of the power part that is to be controlled to obtain an electrical measured variable,
by means of the measuring element, the electrical measured variable can be at least approximately integrated continuously and repeatedly starting from a prescribable initial value over a prescribable integration time corresponding to one or more clock periods of the clocked power part,
a measure value is continuously determined from the integration value, and
the power part is controlled via a control signal comprising the measure value.

20. Device according to claim 19, wherein:
the measuring circuit comprises at least two triggerable measuring elements,
the measured variable can be at least approximately integrated on an alternating basis over prescribable integration times by means of the measuring elements.

21. Device according to claim 19, wherein the measuring part comprises at least one sample-and-hold circuit, which is disposed downstream of the measuring circuit.

22. Device according to claim 21, wherein the measuring part comprises at least one analog-digital converter, which is disposed downstream of the sample-and-hold circuit.

23. Device according to claim 19, wherein the measuring part comprises at least one clock input, to which an external clock frequency can be applied.

24. Device according to claim 19, wherein the at least one triggerable measuring element comprises:
a capacitor, which is connected in series with an ohmic resistor, and
a sampling element,
wherein:
a charge voltage present at the capacitor can be periodically sampled by the sampling element, and
after the sampling has taken place, the capacitor can be discharged to a prescribed initial value.

25. Device according to claim 19, wherein the at least one triggerable measuring element comprises an analog-digital converter which can be synchronized with an external clock frequency.

26. Device according to claim 19, wherein:
the at least one triggerable measuring element comprises an analog-digital converter which is connected by way of one of controllable switching or transmission elements or logical switching or transmission elements to a summating accumulation element,
a continuous data stream provided by the analog-digital converter can be summated over the integration time by means of the accumulation element.

27. Device according to claim 19, wherein the at least one triggerable measuring element comprises a synchronizable operational amplifier.

28. Device according to claim 19, wherein the measuring circuit is configured as a microelectronic circuit.

29. Device according to claim 19, wherein the measuring part is configured as a microelectronic circuit.

30. Power source comprising:
a control part,
a clocked power part, and
a measuring part which comprises a measuring circuit having at least one triggerable measuring element,
wherein:
the measuring part continuously measures a value correlating with a characteristic variable of the power part that is to be controlled to obtain an electrical measured variable,
by means of the measuring element, the electrical measured variable can be at least approximately integrated continuously and repeatedly starting from a prescribable initial value over a prescribable integration time corresponding to one or more clock periods of the clocked power part,
a measure value is continuously determined from the integration value, and
the power part is controlled via a control signal comprising the measure value.

* * * * *